United States Patent
Yang et al.

(10) Patent No.: US 12,289,333 B2
(45) Date of Patent: Apr. 29, 2025

(54) DYNAMIC DEFENSE SYSTEM AND METHOD OF NEW ENERGY CENTRALIZED CONTROL STATION NETWORK BASED ON DYNAMIC IP

(71) Applicants: State Grid Jiangxi Electric Power Research Institute, Nanchang (CN); State Grid Jiangxi Electric Power Co., Ltd., Nanchang (CN); State Grid Corporation of China, Beijing (CN)

(72) Inventors: Hao Yang, Nanchang (CN); Jian Xu, Nanchang (CN); Yongcai Xiao, Nanchang (CN); Lingling Zhang, Nanchang (CN); Shuhui Pan, Nanchang (CN)

(73) Assignees: State Grid Jiangxi Electric Power Research Institute, Nanchang (CN); State Grid Jiangxi Electric Power Co., Ltd., Nanchang (CN); State Grid Corporation of China, Beijing (CN)

(*) Notice: Subject to any disclaimer, the term of this patent is extended or adjusted under 35 U.S.C. 154(b) by 0 days.

(21) Appl. No.: 18/808,231

(22) Filed: Aug. 19, 2024

(65) Prior Publication Data
US 2024/0414183 A1     Dec. 12, 2024

(30) Foreign Application Priority Data
Mar. 7, 2024    (CN) .................. 202410259615.X

(51) Int. Cl.
*H04L 9/40*     (2022.01)
(52) U.S. Cl.
CPC ...... *H04L 63/1425* (2013.01); *H04L 63/1416* (2013.01)

(58) Field of Classification Search
None
See application file for complete search history.

(56) References Cited

U.S. PATENT DOCUMENTS 11,483,339 B1 * 10/2022 Kaimal .............. H04L 63/1416
2005/0028013 A1    2/2005 Cantrell et al.
(Continued)

FOREIGN PATENT DOCUMENTS

CN    114785594 A    *    7/2022
CN    117640214 A    *    3/2024
(Continued)

OTHER PUBLICATIONS

CNIPA, Notification of First Office Action for Chinese application CN202410259615.X, Apr. 16, 2024.
(Continued)

*Primary Examiner* — Joseph P Hirl
*Assistant Examiner* — Hassan Saadoun
(74) *Attorney, Agent, or Firm* — Hemisphere Law, PLLC; Zhigang Ma

(57) ABSTRACT

A method of a new energy centralized control station network based on dynamic IP can determine the occurrence frequency and the occurrence interval of the abnormal traffic, further analyze and determine the defense state of a new energy centralized control station based on this, and execute the corresponding dynamic optimization solution according to different defense states, so that the IP address and the firewall of the new energy centralized control station can be dynamically adjusted to ensure the security performance of the new energy centralized control station, reduce the risk of external intrusion, effectively resist malicious network reconnaissance such as scanning attacks and ensure the stable operation of a new energy power generation system.

7 Claims, 5 Drawing Sheets

(56) References Cited

U.S. PATENT DOCUMENTS

| | | | |
|---|---|---|---|
| 2008/0184331 A1 | 7/2008 | Cam-Winget et al. | |
| 2014/0245443 A1 | 8/2014 | Chakraborty | |
| 2020/0204574 A1* | 6/2020 | Christian | G06F 18/23 |
| 2022/0224706 A1* | 7/2022 | Peng | H04L 49/208 |
| 2023/0049886 A1* | 2/2023 | Sesha | H04L 63/1466 |
| 2023/0224276 A1* | 7/2023 | Chen | H04L 63/0435 |
| | | | 726/11 |
| 2023/0367875 A1* | 11/2023 | Wu | H04L 63/1433 |

FOREIGN PATENT DOCUMENTS

| | | | | |
|---|---|---|---|---|
| WO | WO-2016005273 A1 * | 1/2016 | | H04L 63/0209 |
| WO | WO-2020069367 A1 * | 4/2020 | | G06F 18/214 |

OTHER PUBLICATIONS

CNIPA, Notification to grant patent right for Chinese application CN202410259615.X, May 2, 2024.

\* cited by examiner

DYNAMIC DEFENSE SYSTEM AND METHOD OF NEW ENERGY CENTRALIZED CONTROL STATION NETWORK BASED ON DYNAMIC IP

CROSS-REFERENCE TO RELATED APPLICATIONS

The present disclosure claims priority to Chinese Patent Application No. 202410259615.X with a tile of "DYNAMIC DEFENSE SYSTEM AND METHOD OF NEW ENERGY CENTRALIZED CONTROL STATION NETWORK BASED ON DYNAMIC IP" filed on Mar. 7, 2024, the entire contents of which are incorporated by reference herein.

TECHNICAL FIELD

The present invention belongs to the technical field of defense of new energy centralized control station networks, and particularly relates to a dynamic defense system and method of a new energy centralized control station network based on dynamic IP.

BACKGROUND

With the continuous development of science and technology, the new energy industry has been widely concerned and promoted worldwide. As the core component of a new energy power generation system, the new energy centralized control station is responsible for monitoring, controlling and scheduling each subsystem to ensure the stable operation of the entire system. However, the new energy centralized control station faces many network security challenges, such as hacker attacks, malicious software infection, etc. These problems may lead to system paralysis, and even endanger the safety of personnel and equipment. Therefore, the defense of the new energy centralized control station network has important practical significance.

In the prior art, the security protection of the new energy centralized control station network mainly relies on traditional static defense means, such as firewall, intrusion detection system (IDS), etc. These static defense means can prevent external attacks to a certain extent, but have poor adaptability to internal threats and changing network environments. In addition, the new energy centralized control station usually adopts a fixed IP address, which makes it easier for attackers to find targets and carry out targeted attacks.

SUMMARY

In order to solve the above problems, the present invention provides a dynamic defense system and method of a new energy centralized control station network based on dynamic IP, which can use the adjustment of the dynamic IP address to resist malicious network reconnaissance such as scanning attacks.

The technical solution adopted by the present invention is as follows:

A dynamic defense method of a new energy centralized control station network based on dynamic IP comprises:
acquiring network parameters of a defense target, wherein the network parameters comprise an IP address, a port number and a protocol type;
constructing an IP address mapping table according to the network parameters, wherein the IP address mapping table is used for recording an association relationship between the IP address and a device;
monitoring a network traffic of the defense target in real time, calibrating the network traffic as a monitoring parameter, and inputting the monitoring parameter into a verification model to obtain a traffic state, wherein the traffic state comprises a normal traffic and an abnormal traffic;
constructing a monitoring period, calculating an occurrence frequency and an occurrence interval of the abnormal traffic in the monitoring period, calibrating the occurrence frequency and the occurrence interval as a first to-be-evaluated parameter and a second to-be-evaluated parameter and inputting the first to-be-evaluated parameter and the second to-be-evaluated parameter into an evaluation model to obtain a defense state of the defense target, wherein the defense state comprises a normal defense state and an abnormal defense state;
summarizing data packets corresponding to the network traffic in the monitoring period, inputting the data packets into a dynamic optimization model, and dynamically adjusting the IP address by the dynamic optimization model according to the defense state.

In a preferred solution, a step of inputting the monitoring parameter into a verification model to obtain a traffic state comprises:
acquiring historical network traffic data of the defense target, and classifying the historical network traffic data into a normal traffic database and an abnormal traffic database;
comparing the monitoring parameter with the historical network traffic data in the abnormal traffic database, and when the monitoring parameter has the data packet consistent with the historical network traffic data in the abnormal traffic database, calibrating the monitoring parameter as abnormal traffic; otherwise, comparing the monitoring parameter with the historical network traffic data in the normal traffic database and calibrating a comparison result as a to-be-verified parameter;
invoking a verification threshold from the verification model and comparing with the to-be-verified parameter;
if the to-be-verified parameter is greater than or equal to the verification threshold, indicating that the monitoring parameter is secure and allowing normal access and transmission;
if the to-be-verified parameter is less than the verification threshold, indicating that the monitoring parameter is not secure, intercepting all abnormal data packets under the monitoring parameter and summarizing into the abnormal traffic database.

In a preferred solution, a step of comparing the monitoring parameter with the historical network traffic data in the normal traffic database and calibrating a comparison result as a to-be-verified parameter comprises:
acquiring the historical network traffic data in the normal traffic database and calibrating the data as a reference parameter;
performing vector conversion on the reference parameter and the monitoring parameter to obtain a reference vector corresponding to the reference parameter and a verification vector corresponding to the monitoring parameter;
acquiring a verification function, inputting the reference vector and the verification vector into the verification function for combined operation, and calibrating an output result as a to-be-verified parameter;

wherein a value of the to-be-verified parameter is 0 to 1, and the greater the value of the to-be-verified parameter is, the closer the reference parameter is to the monitoring parameter.

In a preferred solution, the reference parameter comprises a critical parameter and a non-critical parameter, the critical parameter corresponds to a verification threshold of 1, and the non-critical parameter corresponds to a verification threshold of 0.95-1;

wherein eigenvectors corresponding to the critical parameter and the non-critical parameter are inputted into the verification function respectively for combined operation.

In a preferred solution, a step of constructing a monitoring period, calculating an occurrence frequency and an occurrence interval of the abnormal traffic in the monitoring period, and calibrating the occurrence frequency and the occurrence interval as a first to-be-evaluated parameter and a second to-be-evaluated parameter comprises:

setting a plurality of sampling nodes within the monitoring period, and counting the monitoring parameters under each sampling nodes;

calibrating the total occurrence times of the abnormal traffic directly as the first to-be-evaluated parameter;

acquiring all sampling nodes corresponding to the abnormal traffic, calibrating the sampling nodes as abnormal nodes, and arranging all abnormal nodes from front to back according to an occurrence sequence;

acquiring a time interval between the adjacent abnormal nodes and calibrating the time interval as the second to-be-evaluated parameter.

In a preferred solution, a step of inputting the first to-be-evaluated parameter and the second to-be-evaluated parameter into an evaluation model to obtain a defense state of the defense target comprises:

acquiring the first to-be-evaluated parameter and the second to-be-evaluated parameter;

invoking a first evaluation function and a second evaluation function from the evaluation model;

inputting the first to-be-evaluated parameter into the first evaluation function, and calibrating an output result as an abnormal deviation;

inputting the second to-be-evaluated parameter into the second evaluation function, and calibrating an output result as an abnormal trend value;

inputting the abnormal deviation and the abnormal trend value into the evaluation model respectively, and outputting the defense state of the defense target.

In a preferred solution, a step of inputting the abnormal deviation and the abnormal trend value into the evaluation model respectively, and outputting the defense state of the defense target comprises:

acquiring the abnormal deviation and the abnormal trend value in real time;

invoking a first evaluation threshold and a second evaluation threshold from the evaluation model, comparing the abnormal deviation with the first evaluation threshold, and comparing the abnormal trend value with the second evaluation threshold;

if any one of the abnormal deviation and the abnormal trend value exceeds the corresponding first evaluation threshold or second evaluation threshold, issuing an alarm signal immediately, and calibrating the defense state of the defense target as an abnormal defense state;

if the abnormal deviation and the abnormal trend value are both less than the corresponding first evaluation threshold and second evaluation threshold, calibrating the defense state of the defense target as a normal defense state.

In a preferred solution, a step of summarizing data packets corresponding to the network traffic in the monitoring period, inputting the data packets into a dynamic optimization model, and dynamically adjusting the IP address according to an output result comprises:

acquiring the data packets corresponding to the network traffic in the monitoring period and calibrating the data packets as to-be-optimized data;

invoking a preoptimization condition from the dynamic optimization model, wherein the preoptimization condition comprises normal optimization and abnormal optimization, the normal optimization corresponds to the normal defense state, and the abnormal optimization corresponds to the abnormal defense state;

if the preoptimization condition is normal optimization, traversing abnormal fields in all the abnormal data packets, and adjusting an IP address and firewall rules for establishing a session relationship therewith according to the abnormal fields;

if the preoptimization condition is abnormal optimization, traversing the abnormal fields in all the data packets, and adjusting the IP address and the firewall rules for establishing the session relationship therewith according to the abnormal fields.

The present invention further provides a dynamic defense system of a new energy centralized control station network based on dynamic IP, which is applied to the dynamic defense method of the new energy centralized control station network based on dynamic IP, comprising:

an acquiring module for acquiring network parameters of a defense target, wherein the network parameters comprise an IP address, a port number and a protocol type;

a mapping table building module for constructing an IP address mapping table according to the network parameters, wherein the IP address mapping table is used for recording an association relationship between the IP address and a device;

a monitoring module for monitoring a network traffic of the defense target in real time, calibrating the network traffic as a monitoring parameter, and inputting the monitoring parameter into a verification model to obtain a traffic state, wherein the traffic state comprises a normal traffic and an abnormal traffic;

an evaluation module for constructing a monitoring period, calculating an occurrence frequency and an occurrence interval of the abnormal traffic in the monitoring period, calibrating the occurrence frequency and the occurrence interval as a first to-be-evaluated parameter and a second to-be-evaluated parameter and inputting the first to-be-evaluated parameter and the second to-be-evaluated parameter into an evaluation model to obtain a defense state of the defense target, wherein the defense state comprises a normal defense state and an abnormal defense state;

a dynamic optimization module for summarizing data packets corresponding to the network traffic in the monitoring period, inputting the data packets into a dynamic optimization model, and dynamically adjusting the IP address according to an output result;

A dynamic defense terminal of a new energy centralized control station network based on dynamic IP is further provided, comprising:

at least one processor;

and a memory communicatively connected with the at least one processor;

wherein the memory stores a computer program that can be executed by the at least one processor, and the computer program is executed by the at least one processor to enable the least one processor to execute the dynamic defense method of the new energy centralized control station network based on dynamic IP.

The present invention provides a computer readable storage medium on which a computer program is stored. When the computer program is executed, the dynamic defense method of the new energy centralized control station network based on dynamic IP is realized. The technical effects of the present invention are as follows:

By monitoring and statistics of the abnormal traffic, the present invention can determine the occurrence frequency and the occurrence interval of the abnormal traffic, further analyze and determine the defense state of a new energy centralized control station based on this, and execute the corresponding dynamic optimization solution according to different defense states, so that the IP address and the firewall of the new energy centralized control station can be dynamically adjusted to ensure the security performance of the new energy centralized control station, reduce the risk of external intrusion, effectively resist malicious network reconnaissance such as scanning attacks and ensure the stable operation of a new energy power generation system. At the same time, the present invention also has the advantages of simple implementation, remarkable effects, strong adaptability, etc., and has wide application prospects.

DETAILED DESCRIPTION

To make the above-mentioned purpose, features and advantages of the present invention more clear and understandable, specific embodiments of the present invention will be described below in detail in combination with the drawings of the description.

Many details are elaborated in the following description for convenience of fully understanding the present invention. However, the present invention can also be implemented in other modes different from those described herein. Those skilled in the art may make similar promotion without departing from the connotation of the present invention. Therefore, the present invention is not limited by specific embodiments disclosed below.

Secondly, the term "an embodiment" or "embodiment" herein means a specific feature, structure or characteristic that may be included in at least one implementation of the present invention. "In a preferred embodiment" appearing in different places in the description does not mean the same embodiment, nor a separate or selective embodiment that is mutually exclusive with other embodiments.

Embodiment 1

Figure 1:
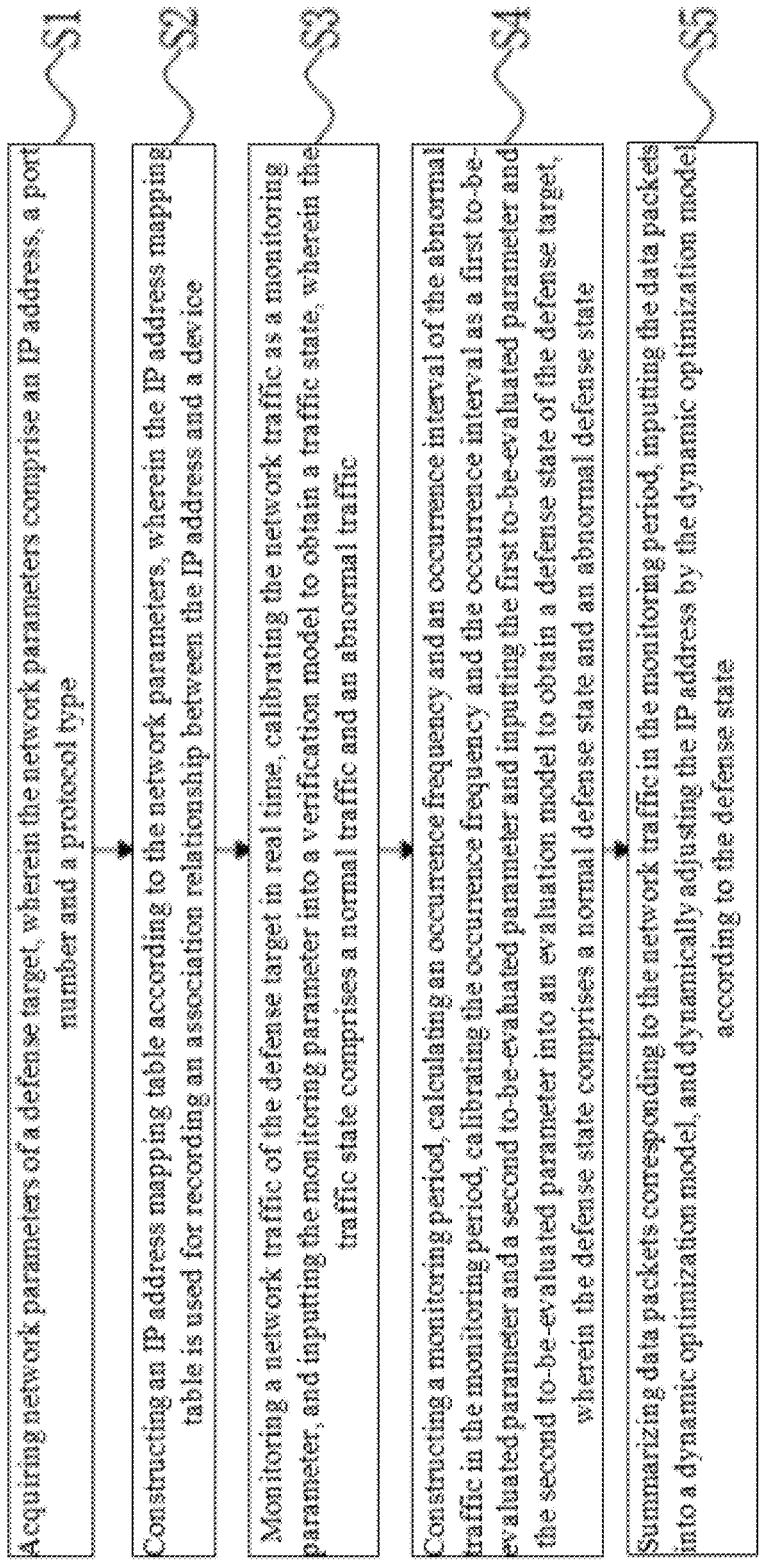
FIG. 1 is a flow chart of a method provided by embodiment 1 of the present invention.

As shown in FIG. 1, which is a first embodiment of the present invention, the embodiment provides a dynamic defense method of a new energy centralized control station network based on dynamic IP, comprising:

S1, acquiring network parameters of a defense target, wherein the network parameters comprise an IP address, a port number and a protocol type;

S2, constructing an IP address mapping table according to the network parameters, wherein the IP address mapping table is used for recording an association relationship between the IP address and a device;

S3, monitoring a network traffic of the defense target in real time, calibrating the network traffic as a monitoring parameter, and inputting the monitoring parameter into a verification model to obtain a traffic state, wherein the traffic state comprises a normal traffic and an abnormal traffic;

S4, constructing a monitoring period, calculating an occurrence frequency and an occurrence interval of the abnormal traffic in the monitoring period, calibrating the occurrence frequency and the occurrence interval as a first to-be-evaluated parameter and a second to-be-evaluated parameter and inputting the first to-be-evaluated parameter and the second to-be-evaluated parameter into an evaluation model to obtain a defense state of the defense target, wherein the defense state comprises a normal defense state and an abnormal defense state;

S5, summarizing data packets corresponding to the network traffic in the monitoring period, inputting the data packets into a dynamic optimization model, and dynamically adjusting the IP address by the dynamic optimization model according to the defense state.

As described in the above steps S1-S5, with the transformation of the global energy structure and the rapid development of the new energy industry, the safe and stable operation of the new energy centralized control station which serves as the core component of the new energy power generation system is of important significance. However, the new energy centralized control station faces increasingly severe network security challenges. In recent years, network attack events for the new energy centralized control station have occurred frequently, which seriously affects the normal operation of the new energy power generation system and the stability of power supply. Therefore, it has become a currently urgent problem to research an effective dynamic defense method of the new energy centralized control station network and improve the network security protection capability of the new energy centralized control station. In the present embodiment, the new energy centralized control station is analyzed as a defense target. Firstly, network parameters of the defense target need to be acquired. The network parameters comprise an IP address, a port number and a protocol type. Then, an IP address mapping table is constructed according to the network parameters for recording an association relationship between the IP address and a device so that the dynamic change of the IP address does not affect the normal operation of the device. The network traffic of the defense target is monitored in real time. The present embodiment calibrates the network traffic as a monitoring parameter, and then inputs the monitoring parameter into a verification model to determine the traffic state. The present embodiment classifies the traffic state into normal traffic and abnormal traffic. In order to ensure the network security of the defense target, a corresponding monitoring period is constructed to regularly summarize and analyze the monitoring parameter. An occurrence frequency and an occurrence interval of the abnormal traffic are calculated in real time in the monitoring period, and calibrated as a first to-be-evaluated parameter and a second to-be-evaluated parameter respectively. Then, a defense state of the defense target is evaluated by an evaluation model. Finally, a dynamic optimization mode of the network traffic in the monitoring period is determined according to the defense state, and the IP address of the defense target and the firewall are adjusted synchronously.

Embodiment 2

Figure 2:
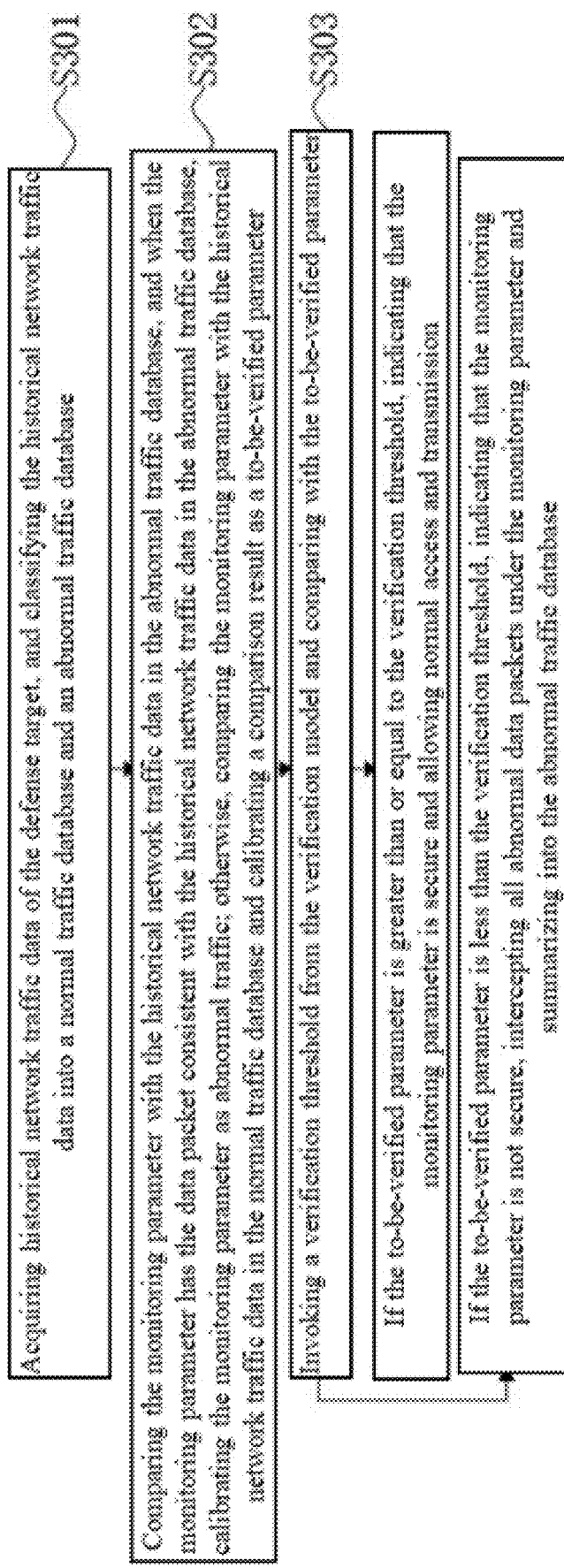
FIG. 2 is a flow chart of a method provided by embodiment 2 of the present invention.

As shown in FIG. 2, which is a second embodiment of the present invention, the embodiment is based on the previous embodiment.

A step of inputting the monitoring parameter into a verification model to obtain a traffic state comprises:

S301, acquiring historical network traffic data of the defense target, and classifying the historical network traffic data into a normal traffic database and an abnormal traffic database;

S302, comparing the monitoring parameter with the historical network traffic data in the abnormal traffic database, and when the monitoring parameter has the data packet consistent with the historical network traffic data in the abnormal traffic database, calibrating the monitoring parameter as abnormal traffic; otherwise, comparing the monitoring parameter with the historical network traffic data in the normal traffic database and calibrating a comparison result as a to-be-verified parameter;

S303, invoking a verification threshold from the verification model and comparing with the to-be-verified parameter;

if the to-be-verified parameter is greater than or equal to the verification threshold, indicating that the monitoring parameter is secure and allowing normal access and transmission;

if the to-be-verified parameter is less than the verification threshold, indicating that the monitoring parameter is not secure, intercepting all abnormal data packets under the monitoring parameter and summarizing into the abnormal traffic database.

As described in the above steps S301-S303, when the verification model performs, firstly, the historical network traffic data of the defense target is acquired. The can help us to better understand the normal behavior of the network and the potential abnormal situation. Then, the historical network traffic data are classified into a normal traffic database and an abnormal traffic database. Then, the monitoring parameter is compared with the historical network traffic data in the abnormal traffic database, and if the monitoring parameter has the data packet consistent with the historical network traffic data in the abnormal traffic database, the monitoring parameter is calibrated as abnormal traffic; otherwise, if the monitoring parameter is compared with the historical network traffic data in the normal traffic database and a comparison result is calibrated as a to-be-verified parameter, a preset verification threshold can be invoked from the verification model and compared with the to-be-verified parameter. The to-be-verified parameter is judged according to the comparison result. If the to-be-verified parameter is greater than or equal to the verification threshold, it indicates that the monitoring parameter is secure and normal access and transmission is allowed, which means that the traffic in the network satisfies the expectations. If the to-be-verified parameter is less than the verification threshold, it indicates that the monitoring parameter has security risks. In this case, it is necessary to take measures to protect the network security. First of all, all abnormal data packets under the monitoring parameter are intercepted to prevent potential attack behaviors, and then these abnormal data packets are summarized to the abnormal traffic database for further analysis and research; and the abnormal data packets consistent therewith can also be intercepted in time when being detected in the future.

Secondly, a step of comparing the monitoring parameter with the historical network traffic data in the normal traffic database and calibrating a comparison result as a to-be-verified parameter comprises:

Step 1, acquiring the historical network traffic data in the normal traffic database and calibrating the data as a reference parameter;

Step 2, performing vector conversion on the reference parameter and the monitoring parameter to obtain a reference vector corresponding to the reference parameter and a verification vector corresponding to the monitoring parameter;

Step 3, acquiring a verification function, inputting the reference vector and the verification vector into the verification function for combined operation, and calibrating an output result as a to-be-verified parameter;

wherein a value of the to-be-verified parameter is 0 to 1, and the greater the value of the to-be-verified parameter is, the closer the reference parameter is to the monitoring parameter.

As described in the above Step 1-Step 3, when the to-be-verified parameter is outputted, it is necessary to acquire the historical network traffic data in the normal traffic database firstly, and these data will be used as the reference parameters for comparison. The goal of this step is to establish a reliable reference standard to facilitate the implementation of the subsequent verification process. Next, the reference parameter and the monitoring parameter need to be subjected to vector transformation to facilitate comparison. This step comprises two main purposes, that is, the generation of a reference vector and the generation of a verification vector. Then, a verification function is introduced for combined operation of the reference vector and the verification vector to judge whether the monitoring parameter conforms to the historical data in the normal traffic database, wherein the expression of the verification function is:

$$R = \frac{\sum_{i=1}^{n}(a_i \times b_i)}{\sqrt{\sum_{i=1}^{n} a_i^2} \times \sqrt{\sum_{i=1}^{n} b_i^2}},$$

wherein R represents the to-be-verified parameter, $a_i$ represents an element in the reference vector, $b_i$ represents an element in the verification vector, and n represents the number of elements in the reference vector and verification vector. Based on the above formula, the to-be-verified parameter can be determined, so as to provide corresponding data support for the verification of the monitoring parameter.

Secondly, the reference parameter comprises a critical parameter and a non-critical parameter, the critical parameter corresponds to a verification threshold of 1, and the non-critical parameter corresponds to a verification threshold of 0.95-1.

wherein eigenvectors corresponding to the critical parameter and the non-critical parameter are inputted into the verification function respectively for combined operation.

In the present embodiment, in the verification process of the reference parameter, two concepts should be clarified at first: the critical parameter and the non-critical parameter. The critical parameter refers to parameters that have a greater impact on network security, and the verification thresholds are set to 1, while the non-critical parameter refers to parameters that have a smaller impact on network security, and the verification thresholds range from 0.95 to 1, which allows deviations from the ideal value to a certain degree. However, it is still necessary to ensure that network security is not seriously affected. After the verification threshold is determined, the corresponding feature vectors of the critical parameter and the non-critical parameter are inputted into the verification function for combined operation. The purpose of this step is to obtain an overall evaluation through comprehensive analysis of different types of parameters to judge whether the performance of network security in these parameters meets the requirements. In this process, the verification of the critical parameter is particularly important, because the critical parameter has a great impact on system performance. For these parameters, we need to ensure that the verification results reach or approach 1, so as to ensure the network security of the defense target. For the non-critical parameter, although the impact on system performance is relatively small, we still need to ensure that the verification results are in the range of 0.95 to 1 to ensure that network security is not significantly affected.

Embodiment 3

Figure 3:
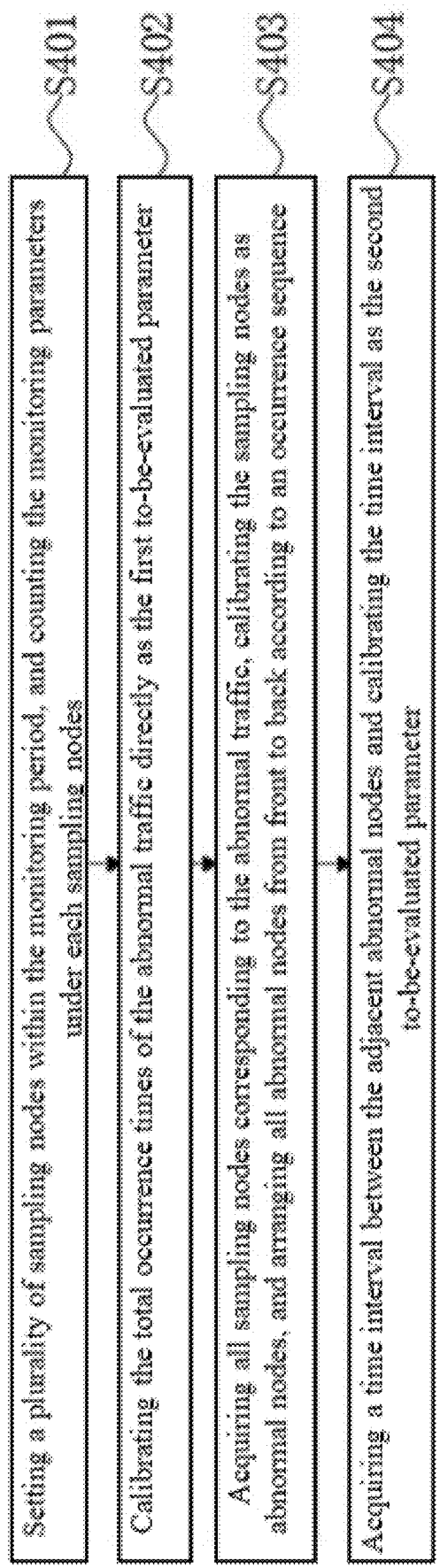
FIG. 3 is a flow chart of a method provided by embodiment 3 of the present invention.

As shown in FIG. 3, which is a third embodiment of the present invention, the embodiment is based on the first two embodiments.

A step of constructing a monitoring period, calculating an occurrence frequency and an occurrence interval of the abnormal traffic in the monitoring period, and calibrating the occurrence frequency and the occurrence interval as a first to-be-evaluated parameter and a second to-be-evaluated parameter comprises:

S401, setting a plurality of sampling nodes within the monitoring period, and counting the monitoring parameters under each sampling nodes;

S402, calibrating the total occurrence times of the abnormal traffic directly as the first to-be-evaluated parameter;

S403, acquiring all sampling nodes corresponding to the abnormal traffic, calibrating the sampling nodes as abnormal nodes, and arranging all abnormal nodes from front to back according to an occurrence sequence;

S404, acquiring a time interval between the adjacent abnormal nodes and calibrating the time interval as the second to-be-evaluated parameter.

As described in the above steps S401-S404, when abnormal traffic is analyzed, multiple sampling nodes are set at first in the monitoring period and the abnormal traffic in the network under these sampling nodes is captured to provide a basis for subsequent analysis and evaluation. In all the sampling nodes, the total number of occurrence times of the abnormal traffic is directly taken as the first to-be-evaluated parameter which can quickly understand the occurrence frequency of the abnormal traffic, so as to provide a basis for subsequent troubleshooting and network optimization. All sampling nodes corresponding to the abnormal traffic are identified and calibrated as abnormal nodes. In order to better analyze abnormal situations, these abnormal nodes need to be arranged from front to back according to an occurrence sequence. Finally, a time interval between adjacent abnormal nodes is acquired, and used as the second to-be-evaluated parameter, so that the evolution trend of the abnormal traffic can be more clearly understood in the subsequent evaluation.

Secondly, a step of inputting the first to-be-evaluated parameter and the second to-be-evaluated parameter into an evaluation model to obtain a defense state of the defense target comprises:

S405, acquiring the first to-be-evaluated parameter and the second to-be-evaluated parameter;

S406, invoking a first evaluation function and a second evaluation function from the evaluation model;

S407, inputting the first to-be-evaluated parameter into the first evaluation function, and calibrating an output result as an abnormal deviation;

S408, inputting the second to-be-evaluated parameter into the second evaluation function, and calibrating an output result as an abnormal trend value;

S409, inputting the abnormal deviation and the abnormal trend value into the evaluation model respectively, and outputting the defense state of the defense target.

As described in the above steps S405-S409, during the execution of the evaluation model, firstly, the first to-be-evaluated parameter and the second to-be-evaluated parameter are obtained, and then the first evaluation function corresponding to the first to-be-evaluated parameter and the second evaluation function corresponding to the second to-be-evaluated parameter are invoked from the evaluation model, wherein the expression of the first evaluation function is: $C_p=g_y-g_d$, wherein $C_p$ represents an abnormal deviation, $g_y$ represents a permissible upper limit of occurrence of the abnormal traffic, and $g_d$ represents the first to-be-evaluated parameter. The expression of the second evaluation function is $$Q = \frac{1}{m-1}\sum_{i=2}^{m}(T_j - T_{j-1}),$$

wherein Q represents an abnormal trend value, m represents the number of the second to-be-evaluated parameters; $T_j$ and $T_{j-1}$ represents adjacent second to-be-evaluated parameters. After the abnormal trend value and the abnormal deviation are determined, they can be inputted into the evaluation model to determine the defense state of the defense target.

Further, a step of inputting the abnormal deviation and the abnormal trend value into the evaluation model respectively, and outputting the defense state of the defense target comprises:

Step 1, acquiring the abnormal deviation and the abnormal trend value in real time;

Step 2, invoking a first evaluation threshold and a second evaluation threshold from the evaluation model, comparing the abnormal deviation with the first evaluation threshold, and comparing the abnormal trend value with the second evaluation threshold;

if any one of the abnormal deviation and the abnormal trend value exceeds the corresponding first evaluation threshold or second evaluation threshold, issuing an alarm signal immediately, and calibrating the defense state of the defense target as an abnormal defense state;

if the abnormal deviation and the abnormal trend value are both less than the corresponding first evaluation threshold and second evaluation threshold, calibrating the defense state of the defense target as a normal defense state.

As described in the above step 1 to step 2, after the abnormal deviation and the abnormal trend value are determined, the first evaluation threshold and the second evaluation threshold can be invoked from the evaluation model for comparison, wherein if any one of the abnormal deviation and the abnormal trend value exceeds the corresponding first evaluation threshold or second evaluation threshold, it indicates that the defense state of the defense target is abnormal, and an alarm signal is immediately issued at this time. At the same time, the defense state of the defense target is calibrated as an abnormal defense state. In this state, all data packets need to be traversed to screen out abnormal fields and update the IP address accordingly. Otherwise, the abnormal fields in the abnormal data packets can be traversed, without the need of frequently traversing all the data packets.

Embodiment 4

Figure 4:
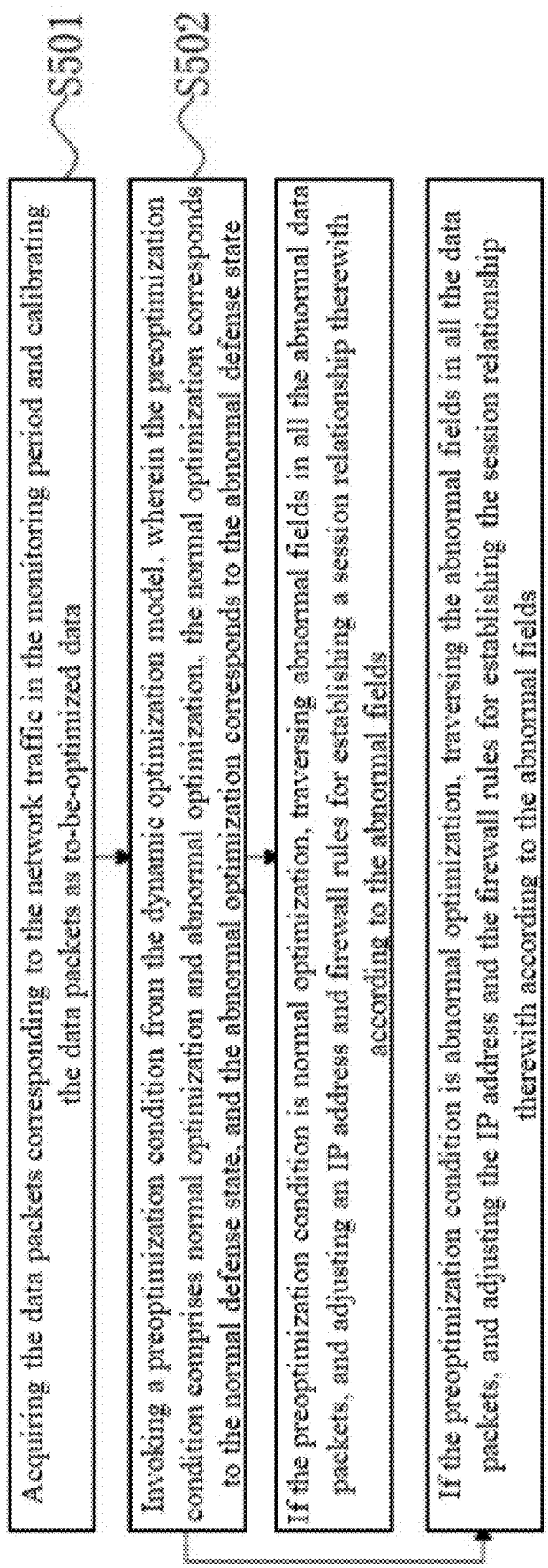
FIG. 4 is a flow chart of a method provided by embodiment 4 of the present invention.

As shown in FIG. 4, which is a fourth embodiment of the present invention, the embodiment is based on the first three embodiments.

A step of summarizing data packets corresponding to the network traffic in the monitoring period, inputting the data packets into a dynamic optimization model, and dynamically adjusting the IP address according to an output result comprises:

S501, acquiring the data packets corresponding to the network traffic in the monitoring period and calibrating the data packets as to-be-optimized data;

S502, invoking a preoptimization condition from the dynamic optimization model, wherein the preoptimization condition comprises normal optimization and abnormal optimization, the normal optimization corresponds to the normal defense state, and the abnormal optimization corresponds to the abnormal defense state;

if the preoptimization condition is normal optimization, traversing abnormal fields in all the abnormal data packets, and adjusting an IP address and firewall rules for establishing a session relationship therewith according to the abnormal fields;

if the preoptimization condition is abnormal optimization, traversing the abnormal fields in all the data packets, and adjusting the IP address and the firewall rules for establishing the session relationship therewith according to the abnormal fields.

As described in the above steps S501-S502, during the execution of the dynamic optimization model, the data packets corresponding to network traffic in the monitoring period are firstly collected, and are calibrated as the to-be-optimized data in the present embodiment. Then, the preoptimization condition is invoked from the dynamic optimization model and matched with the defense state of the defense target, wherein the normal defense state corresponds to the normal optimization, and the abnormal defense state corresponds to the abnormal optimization. In the normal optimization, the abnormal fields in all the data packets are traversed only and the IP address and the firewall rules for establishing a session relationship therewith are adjusted according to the abnormal fields. On the contrary, in the abnormal optimization, the abnormal fields in all the data packets are traversed, so as to adjust the IP address and the firewall rules for establishing the session relationship therewith, so that the IP address of the defense target can be dynamically adjusted to reduce security risks such as intrusion.

Embodiment 5

Figure 5:
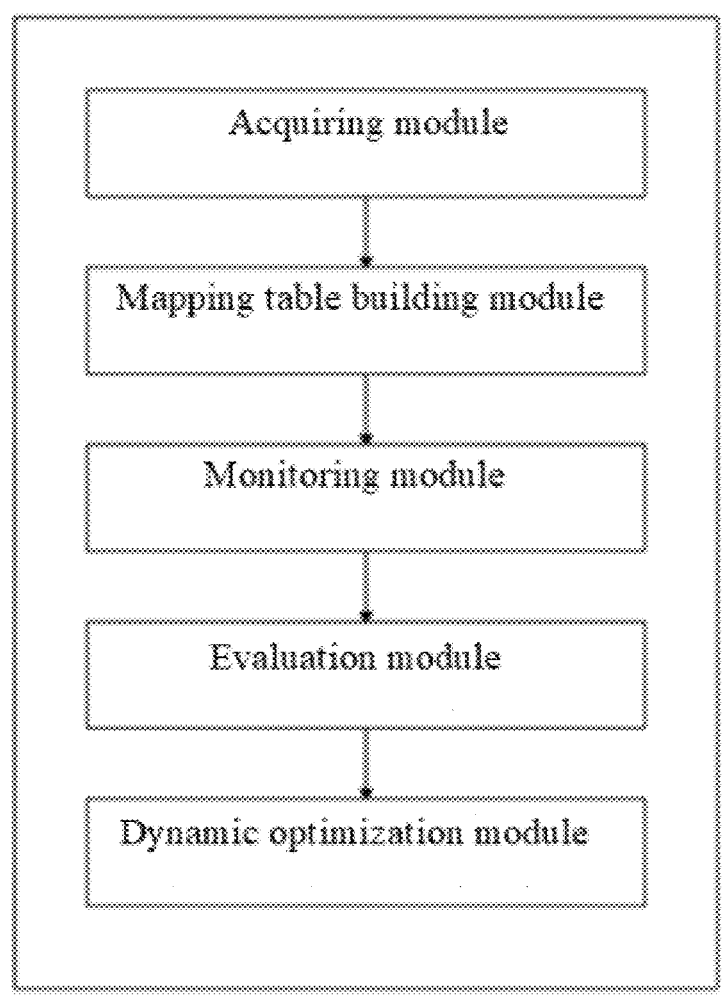
FIG. 5 is a module diagram of a system provided by embodiment 5 of the present invention.

As shown in FIG. 5, which is a fifth embodiment of the present invention, the embodiment is based on the first four embodiments. The present embodiment further provides a dynamic defense system of a new energy centralized control station network based on dynamic IP, which is applied to the dynamic defense method of the new energy centralized control station network based on dynamic IP, comprising:

an acquiring module for acquiring network parameters of a defense target, wherein the network parameters comprise an IP address, a port number and a protocol type;

a mapping table building module for constructing an IP address mapping table according to the network parameters, wherein the IP address mapping table is used for recording an association relationship between the IP address and a device;

a monitoring module for monitoring a network traffic of the defense target in real time, calibrating the network traffic as a monitoring parameter, and inputting the monitoring parameter into a verification model to obtain a traffic state, wherein the traffic state comprises a normal traffic and an abnormal traffic;

an evaluation module for constructing a monitoring period, calculating an occurrence frequency and an occurrence interval of the abnormal traffic in the monitoring period, calibrating the occurrence frequency and the occurrence interval as a first to-be-evaluated parameter and a second to-be-evaluated parameter and inputting the first to-be-evaluated parameter and the second to-be-evaluated parameter into an evaluation model to obtain a defense state of the defense target, wherein the defense state comprises a normal defense state and an abnormal defense state;

a dynamic optimization module for summarizing data packets corresponding to the network traffic in the monitoring period, inputting the data packets into a dynamic optimization model, and dynamically adjusting the IP address according to an output result;

As described above, when the defense system performs, firstly, network parameters of the defense target are collected through the acquiring module. Then, an IP address mapping table is constructed according to the network parameters through the mapping table building module for recording an association relationship between the IP address and a device so that the dynamic change of the IP address does not affect the normal operation of the device. Next, the monitoring module is used for collecting the network traffic of the defense target in real time and determining the network traffic as a monitoring parameter. Then, the monitoring parameter is inputted into the verification model to determine the traffic state. Meanwhile, an occurrence frequency and an occurrence interval of the abnormal traffic in the monitoring period are collected through the evaluation module to obtain a first to-be-evaluated parameter and a second to-be-evaluated parameter. In combination with the execution of the evaluation model, the defense state of the defense target can be determined. Finally, the dynamic optimization module is executed according to the defense state of the defense target to realize the dynamic adjustment of the device IP address and improve the security of the device network.

Embodiment 6

Based on the first five embodiments, the present embodiment provides a dynamic defense terminal of a new energy centralized control station network based on dynamic IP, comprising:
at least one processor;
and a memory communicatively connected with the at least one processor;
wherein the memory stores a computer program that can be executed by the at least one processor, and the computer program is executed by the at least one processor to enable the least one processor to execute the dynamic defense method of the new energy centralized control station network based on dynamic IP.

Embodiment 7

The present embodiment provides a computer readable storage medium on which a computer program is stored. When the computer program is executed, the dynamic defense method of the new energy centralized control station network based on dynamic IP is realized.

It should be noted that terms of "comprise", "include" or any other variant herein are intended to cover non-exclusive inclusion, so that a process, a device, an article or a method which includes a series of elements not only includes such elements, but also includes other elements not listed clearly or also includes inherent elements in the process, the device, the article or the method. Under the condition of no more limitation, the elements defined by a sentence "include one . . . " do not exclude additional identical elements in the process, the device, the article or the method which includes the elements.

The above only describes preferred embodiments of the present invention. It should be noted that, for those ordinary skilled in the art, many improvements and polishes may be made without departure from the technical principles of the present invention, and these improvements and polishes should also be deemed to be fallen into the protection scope of the present invention. Structures, devices and operation methods not specifically described and explained in the present invention are implemented in accordance with conventional means in the art unless otherwise specified and limited.

What is claimed is:

1. A dynamic defense method of a new energy centralized control station network based on dynamic IP, comprising:
acquiring network parameters of a defense target, wherein the network parameters comprise an IP address, a port number and a protocol type;
constructing an IP address mapping table according to the network parameters, wherein the IP address mapping table is used for recording an association relationship between the IP address and a device;
monitoring a network traffic of the defense target in real time, calibrating the network traffic as a monitoring parameter, and inputting the monitoring parameter into a verification model to obtain a traffic state, wherein the traffic state comprises a normal traffic and an abnormal traffic;
constructing a monitoring period, calculating an occurrence frequency and an occurrence interval of the abnormal traffic in the monitoring period, calibrating the occurrence frequency and the occurrence interval as a first to-be-evaluated parameter and a second to-be-evaluated parameter and inputting the first to-be-evaluated parameter and the second to-be-evaluated parameter into an evaluation model to obtain a defense state of the defense target, wherein the defense state comprises a normal defense state and an abnormal defense state; comprising:
acquiring the first to-be-evaluated parameter and the second to-be-evaluated parameter;
invoking a first evaluation function and a second evaluation function from the evaluation model;
inputting the first to-be-evaluated parameter into the first evaluation function, and calibrating an output result as an abnormal deviation;
inputting the second to-be-evaluated parameter into the second evaluation function, and calibrating an output result as an abnormal trend value;
inputting the abnormal deviation and the abnormal trend value into the evaluation model respectively, and outputting the defense state of the defense target;
inputting the abnormal deviation and the abnormal trend value into the evaluation model respectively, and outputting the defense state of the defense target specifically comprises:
acquiring the abnormal deviation and the abnormal trend value in real time;
invoking a first evaluation threshold and a second evaluation threshold from the evaluation model, comparing the abnormal deviation with the first evaluation threshold, and comparing the abnormal trend value with the second evaluation threshold;
if any one of the abnormal deviation and the abnormal trend value exceeds the corresponding first evaluation threshold or second evaluation threshold, issuing an alarm signal immediately, and calibrating the defense state of the defense target as an abnormal defense state;
if the abnormal deviation and the abnormal trend value are both less than the corresponding first evaluation threshold and second evaluation threshold, calibrating the defense state of the defense target as a normal defense state;
summarizing data packets corresponding to the network traffic in the monitoring period, inputting the data packets into a dynamic optimization model, and dynamically adjusting the IP address by the dynamic optimization model according to the defense state.

2. The dynamic defense method of the new energy centralized control station network based on dynamic IP according to claim 1, wherein a step of inputting the monitoring parameter into the verification model to obtain a traffic state comprises:
acquiring historical network traffic data of the defense target, and classifying the historical network traffic data into a normal traffic database and an abnormal traffic database;
comparing the monitoring parameter with the historical network traffic data in the abnormal traffic database, and when the monitoring parameter has the data packet consistent with the historical network traffic data in the abnormal traffic database, calibrating the monitoring parameter as abnormal traffic; otherwise, comparing the monitoring parameter with the historical network traffic data in the normal traffic database and calibrating a comparison result as a to-be-verified parameter;

invoking a verification threshold from the verification model and comparing with the to-be-verified parameter;

if the to-be-verified parameter is greater than or equal to the verification threshold, indicating that the monitoring parameter is secure and allowing normal access and transmission;

if the to-be-verified parameter is less than the verification threshold, indicating that the monitoring parameter is not secure, intercepting all abnormal data packets under the monitoring parameter and summarizing into the abnormal traffic database.

3. The dynamic defense method of the new energy centralized control station network based on dynamic IP according to claim 2, wherein a step of comparing the monitoring parameter with the historical network traffic data in the normal traffic database and calibrating a comparison result as a to-be-verified parameter comprises:

acquiring the historical network traffic data in the normal traffic database and calibrating the data as a reference parameter;

performing vector conversion on the reference parameter and the monitoring parameter to obtain a reference vector corresponding to the reference parameter and a verification vector corresponding to the monitoring parameter;

acquiring a verification function, inputting the reference vector and the verification vector into the verification function for combined operation, and calibrating an output result as a to-be-verified parameter;

wherein a value of the to-be-verified parameter is 0 to 1, and the greater the value of the to-be-verified parameter is, the closer the reference parameter is to the monitoring parameter.

4. The dynamic defense method of the new energy centralized control station network based on dynamic IP according to claim 1, wherein a step of constructing a monitoring period, calculating an occurrence frequency and an occurrence interval of the abnormal traffic in the monitoring period, and calibrating the occurrence frequency and the occurrence interval as a first to-be-evaluated parameter and a second to-be-evaluated parameter comprises:

setting a plurality of sampling nodes within the monitoring period, and counting the monitoring parameters under each sampling nodes;

calibrating the total occurrence times of the abnormal traffic directly as the first to-be-evaluated parameter;

acquiring all sampling nodes corresponding to the abnormal traffic, calibrating the sampling nodes as abnormal nodes, and arranging all abnormal nodes from front to back according to an occurrence sequence;

acquiring a time interval between the adjacent abnormal nodes and calibrating the time interval as the second to-be-evaluated parameter.

5. The dynamic defense method of the new energy centralized control station network based on dynamic IP according to claim 1, wherein a step of summarizing data packets corresponding to the network traffic in the monitoring period, inputting the data packets into the dynamic optimization model, and dynamically adjusting the IP address according to the defense state by a dynamic optimization module comprises:

acquiring the data packets corresponding to the network traffic in the monitoring period and calibrating the data packets as to-be-optimized data;

invoking a preoptimization condition from the dynamic optimization model, wherein the preoptimization condition comprises normal optimization and abnormal optimization, the normal optimization corresponds to the normal defense state, and the abnormal optimization corresponds to the abnormal defense state;

if the preoptimization condition is normal optimization, traversing abnormal fields in all the abnormal data packets, and adjusting an IP address and firewall rules for establishing a session relationship therewith according to the abnormal fields;

if the preoptimization condition is abnormal optimization, traversing the abnormal fields in all the data packets, and adjusting the IP address and the firewall rules for establishing the session relationship therewith according to the abnormal fields.

6. A dynamic defense terminal of a new energy centralized control station network based on dynamic IP, comprising:

at least one processor;

and a memory communicatively connected with the at least one processor;

wherein the memory stores a computer program that can be executed by the at least one processor, and the computer program is executed by the at least one processor to enable the least one processor to execute the dynamic defense method of the new energy centralized control station network based on dynamic IP according to claim 1.

7. A computer readable storage medium, on which a computer program is stored, wherein when the computer program is executed, the dynamic defense method of the new energy centralized control station network based on dynamic IP according to claim 1 is realized.

* * * * *